United States Patent
Barberet et al.

(10) Patent No.: US 9,075,685 B2
(45) Date of Patent: Jul. 7, 2015

(54) METHOD AND DEVICE FOR OPTIMIZING DATA UPDATES IN OPERATIONALLY APPROVED SOFTWARE APPLICATIONS OF AIRCRAFT

(71) Applicant: Airbus Operations SAS, Toulouse (FR)

(72) Inventors: Vincent Barberet, Toulouse (FR); Francois Beltrand, Villeneuve Tolosane (FR)

(73) Assignee: Airbus Operations SAS, Toulouse (FR)

( * ) Notice: Subject to any disclaimer, the term of this patent is extended or adjusted under 35 U.S.C. 154(b) by 156 days.

(21) Appl. No.: 13/771,706

(22) Filed: Feb. 20, 2013

(65) Prior Publication Data

US 2013/0247025 A1   Sep. 19, 2013

(30) Foreign Application Priority Data

Feb. 20, 2012   (FR) .................................... 12 51532

(51) Int. Cl.
*G06F 9/44* (2006.01)
*G06F 9/445* (2006.01)
*G06F 11/14* (2006.01)

(52) U.S. Cl.
CPC .............. *G06F 8/65* (2013.01); *G06F 11/1433* (2013.01); *G06F 8/71* (2013.01); *G06F 8/60* (2013.01); *G06F 8/61* (2013.01)

(58) Field of Classification Search
CPC .............. G06F 8/65; G06F 8/60; G06F 8/61; G06F 8/70; G06F 8/71; G06F 11/1433
See application file for complete search history.

(56) References Cited

U.S. PATENT DOCUMENTS

| 8,910,145 | B2 * | 12/2014 | Baraldi et al. ................. 717/178 |
| 2004/0106404 | A1 * | 6/2004 | Gould et al. ................... 455/431 |
| 2004/0243994 | A1 * | 12/2004 | Nasu .............................. 717/171 |
| 2010/0083242 | A1 * | 4/2010 | Altstaedt et al. .............. 717/169 |

(Continued)

FOREIGN PATENT DOCUMENTS

WO   2009082592   7/2009

OTHER PUBLICATIONS

Stephen T. LeDoux et al.; MDOT—A Multidisciplinary Design Optimization System Using Higher Order Analysis Codes; Sep. 1, 2004; 10th AIAA/ISSMO Multidisciplinary Analysis and Optimization Conference; pp. 1-20; Retrieved online on Feb. 5, 2015; Retrieved from the Internet: <URL: http://arc.aiaa.org/doi/pdf/10.2514/6.2004-4567>.*

(Continued)

*Primary Examiner* — Thuy Dao
*Assistant Examiner* — Hanh T Bui
(74) *Attorney, Agent, or Firm* — Greer, Burns & Crain, Ltd

(57) ABSTRACT

Optimizing data updates in an operationally approved software application of aircraft, comprising a first software component using a second software component. Following the receipt of a software component comprising an update of said second software component, said received software component is analyzed and a class of the update of said second software component is determined. Depending on said class, the update of said second software component is transmitted to said first software component and/or to a central download system. If the update of said second software component is transmitted to said first software component, said second software component is updated and a configuration report showing said update is created.

9 Claims, 2 Drawing Sheets

(56) References Cited

U.S. PATENT DOCUMENTS

| | | | |
|---|---|---|---|
| 2010/0235289 A1* | 9/2010 | Frayssignes et al. | 717/168 |
| 2012/0240108 A1* | 9/2012 | Baraldi et al. | 717/176 |
| 2014/0282491 A1* | 9/2014 | Baraldi et al. | 717/174 |

OTHER PUBLICATIONS

Austin Armbruster et al.; a Real-Time Java Virtual Machine with Applications in Avionics; Dec. 2007; ACM; vol. 7; pp. 1-49; Retrieved online on Feb. 5, 2015; Retrieved from the Internet: <URL: http://delivery.acm.org/10.1145/1330000/1324974/a5-armbruster.pdf?>.*

Marcus C. Sampaio et al.; Incremental Updates on Mobile Datawarehousing Using Optimized Hierarchial Views and New Aggregation Operators; IEEE; 2003; pp. 1-6; Retrieved online on Feb. 5, 2015; Retrieved from the Internet: <URL: http://ieeexplore.ieee.org/stamp/stamp.jsp?tp=&arnumber=1192847>.*

French search report, Nov. 7, 2012.

Advisory Circular, Aircraft Software Configuration Management, Sep. 30, 2010, cited in French Search Report.

Arinc Report, Guidance for the management of field loadable software, Nov. 12, 2010, cited in French Search Report.

* cited by examiner

METHOD AND DEVICE FOR OPTIMIZING DATA UPDATES IN OPERATIONALLY APPROVED SOFTWARE APPLICATIONS OF AIRCRAFT

CROSS-REFERENCES TO RELATED APPLICATIONS

This application claims the benefit of the French patent application No. 1251532 filed on Feb. 20, 2012, the entire disclosures of which are incorporated herein by way of reference.

BACKGROUND OF THE INVENTION

The present invention relates to updating software components in computer systems and more particularly to a method and device for optimizing data updates in operationally approved software applications of aircraft as defined in the standard ARINC 667.

In order to simplify aircraft maintenance operations and facilitate the deployment of improvements and/or corrections to certain aircraft components, typically calculator software components, the use of downloadable software applications has become widespread on recent generations of aircraft.

The latter thus comprise download mechanisms that can be used to update certain calculator software components. To this end, new versions of so-called software applications, or constituents of said applications, so-called software components, are brought into the aircraft in question on physical storage media or via wired or wireless computer communication means. Calculator update operations, hereinafter referred to as downloads, are then performed, and a configuration report is generated. When a download is performed, an operator consults the configuration report generated in order to check that the corresponding operation has taken place correctly.

A criticality level is generally associated with the updates performed, depending on the components affected by them. Each criticality level typically requires specific operations and qualifications on the part of the operators performing the updates. Various regulations thus exist that apply to the onboard software update operations and mechanisms. In order to homogenize and clarify the various types of software, the company ARINC (Aeronautical Radio Incorporated) published standard ARINC 667, which classifies software according to the regulations applicable thereto.

When an operator performs a software installation or update operation, he must certify that he has installed the correct version of the correct software on the correct equipment, as required and in accordance with the correct procedure. To this end, the download mechanisms generally make it possible to report, by means of configuration reports, the version of the installed software applications together with the functional location, hereinafter referred to as FIN (Functional Item Number) thereof, and the items of equipment involved. Said configuration reports tend to group together the configurations of large numbers of software applications installed on different items of equipment so that the operator does not have to process a configuration report for each software component or each item of equipment.

Said configuration reports thus contain a list of the software applications installed on the various items of equipment that are downloadable, and the version thereof. Typically, they also contain additional items of information relating to the software applications that are the subject of specific regulations and to said regulations.

When said configuration reports contain items of information according to which the configuration of items of equipment has potentially significant impacts on the security or safety of the aircraft, they can generally only be viewed on board the aircraft on equipment approved and usable for certification purposes. It is therefore necessary, during the use of certain software update mechanisms, to request that qualified maintenance personnel visit the aircraft to perform the operations.

Furthermore, it has been observed that a number of software applications require the transfer of large quantities of data to the aircraft during frequent updates.

Thus, in other words, software component updates generally take place in three steps:
importing data from a support or via a communication network;
an operator installing the imported software component (download) on the equipment; and
generating a configuration report describing the installed content.

The configuration report comprises a list of software components installed on the various items of equipment and the version of each software component. There is therefore cardinality of one-to-one between a version of a software component and the functional identifier to which it is linked. It is therefore necessary, during a software component update, to import and install the entire software component even if only part of it has been modified.

To improve the updating of software on aircraft, it is possible to subdivide the software components further into software subcomponents. This makes it possible to update only those software subcomponents that have changed.

Another improvement consists of creating several functional identifiers for a software component that is capable of being incrementally supplemented at a later date by other software components, and creating a list of said functional identifiers that can receive increments.

However, these solutions are not ideal. Firstly, the initial subdivision must take into account the structure of the software as well as any future developments, which is often unrealistic and results in a lack of clarity about the functional subdivision, which becomes a technical subdivision that is more difficult for an operator to grasp. Moreover, the greater the number of software components, the greater the complexity of managing the configuration.

Furthermore, for performance reasons and in order to place a limit on the number of subcomponents forming a software component, a new complete version of the software component must be installed regularly. Moreover, in order to ensure that the new configuration is always an accurate image of the status of the aircraft, some of the previously installed increments must be uninstalled, which creates a specific procedure with an impact for the operators.

Finally, as a result of said improvements, the software components installed become more complex. It can consequently be difficult to meet the requirements regarding the integration of the software components into the calculators. It can become difficult, or even impossible, to manage the increments necessarily installed in locations that are, by their nature, different from each other and different from the previous complete version of the corresponding software.

There is therefore a need to improve aircraft software update systems, limiting operators' working time and visits to the aircraft.

SUMMARY OF THE INVENTION

The object of the invention is thus a method for updating at least one software component belonging to at least one operationally approved software application utilized in an aircraft computer system, said at least one operationally approved software application comprising at least one first software component using at least one second software component, the method comprising the following steps:

receipt, by the aircraft computer system, of a software component comprising at least one update of said at least one second software component;

analysis, by the aircraft computer system, of said at least one received software component and determination of a class of said at least one update of said at least one second software component in response to said analysis step;

depending on said class, transmission, by the aircraft computer system, of said at least one update of said at least one second software component to at least said at least one first software component and/or to a central download system;

if said at least one update of at least one second software component is transmitted to at least said at least one first software component, updating of said at least one second software component by the aircraft computer system; and creation of a configuration report showing said update.

The method according to the invention can thus be used to improve the updating of operationally approved application software components, particularly as set out in the standard ARINC 667, utilized in an aircraft computer system, limiting in particular operators' working time and visits to the aircraft.

The method according to the invention is compatible with the current maintenance operations and does not give rise to new operations for the operators of the aircraft nor specific preliminary operations such as uninstallation and reconfiguration operations. Moreover, characteristics of each of the pieces of software are shown in a single configuration report, meaning that the operator does not have to consult multiple reports. Furthermore, the data format of the updates can be the format commonly used, typically loads formatted in accordance with the standard ARINC 665.

The configuration report(s) generated when the method according to the invention is implemented reflect the status of the aircraft. This means in particular that the installation of all of the pieces of software shown in the configuration report ensures that the aircraft has the required status. There is therefore a bijection between the contents of a configuration report and an aircraft status.

Advantageously, the method also comprises a step of validation of said received software component, used in particular to check that the data received correspond to the data required.

According to a particular embodiment, the method also comprises a step of validation of said at least one update of said at least one second software component. Such validation can, for example, consist of checking the compatibility of the data received with previously received data.

Still according to a particular embodiment, the method also comprises a step of interrogating said at least one first software component to obtain items of configuration information from said at least one first software component relating to said at least one second software component. Said at least one first software component is thus capable of reporting on its configuration, for which it can be responsible. This decentralization of the management of the data configuration makes it possible in particular to avoid subjection to rules limiting the number of technical solutions.

Advantageously, the method also comprises a step of integration of said obtained items of configuration information into a configuration report generated by said central download system.

Still according to a particular embodiment, the method also comprises a step of receipt of an activation request of said update of said at least one second software component, said step of updating said at least one second software component being performed in response to the receipt of said activation request.

The method thus makes it possible to demonstrate the consistency of update data, with respect to approval, prior to the actual update.

Advantageously, said items of configuration information comprise an indication of activation or non-activation of said update of said at least one second software component that can be used to identify an update status.

According to a particular embodiment, the method also comprises a step of generating said activation request enabling an actual update.

A further object of the invention is a computer program comprising instructions suitable for the implementation of each of the steps of the method described above when said program is executed on a computer, together with a device comprising means suitable for the implementation of each of the steps of said method. The advantages procured by said computer program and said device are similar to those mentioned above.

BRIEF DESCRIPTION OF THE DRAWINGS

Further advantages, aims and features of the present invention will become apparent from the detailed description below, given as a non-limitative example, in relation to the attached drawings, in which.

DETAILED DESCRIPTION OF THE PREFERRED EMBODIMENTS

Firstly, it is observed that the software applications (or software) utilized in an aircraft are linked to different regulations and, consequently, their configuration may be managed in different ways.

Figure 1:
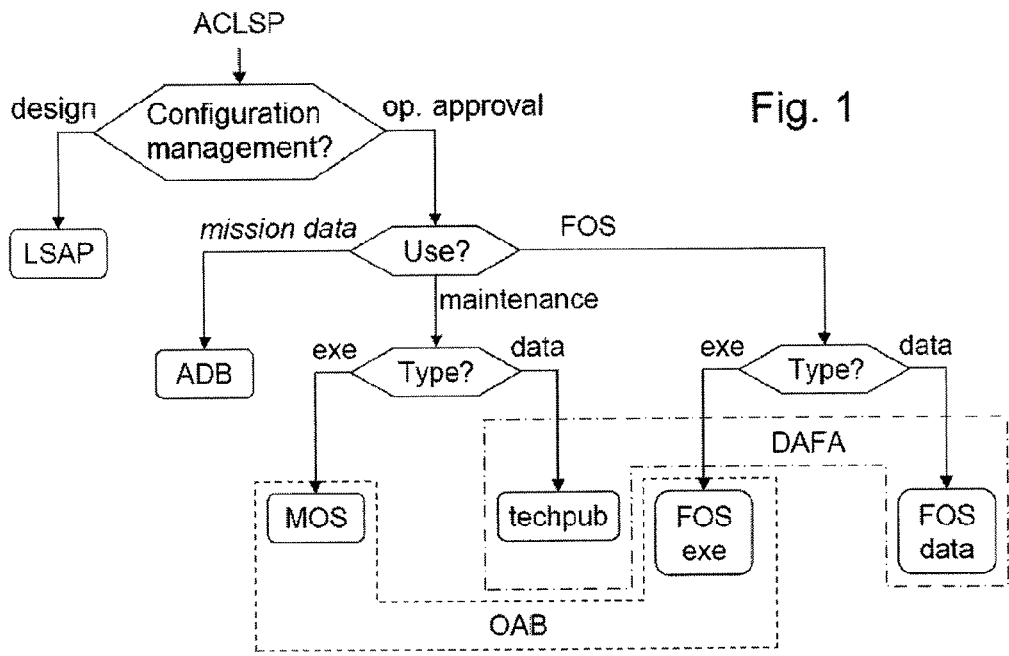
FIG. 1 shows a breakdown tree of the software that can be downloaded onto an aircraft in accordance with ARINC 667 regulations.

As shown in FIG. 1, which shows a breakdown tree of the software that can be downloaded onto an aircraft in accordance with ARINC 667 regulations, the software applications utilized in an aircraft capable of receiving such applications, also known as ACLSP (Aircraft Controlled Loadable Software Part) can be grouped into four categories in accordance with the standard ARINC 667:

software applications certified as part of the design of the aircraft, generally known as LSAP (Loadable Software Aircraft Part);

calculation software applications that must be operationally approved by the aircraft operator's local authorities, generally known as OAB (Operationally Approved Binaries), comprising MOS (Maintenance Operations Software), i.e. software used for maintenance operations and some of the FOS (Flight Operations Software), i.e. software used for operations related to the flight of the aircraft;

software components made up of data, typically in the form of tables, used by approved applications, generally known as DAFA (Data for Approved Applications), comprising data known as techpub and some of the FOS; and software components updated on each mission, known as "mission data" and stored in databases known as ADB (Aeronautical DataBases).

LSAP software applications must follow the rule according to which there is a single software version per logical location in order to comply with the aircraft's certification requirements.

OAB software applications can depart from such a configuration rule required for certification of the aircraft. However, due to their computing similarity to LSAP software applications, and given that operators must justify their configuration to a supervisory authority, it is preferable that they be managed according to the configuration rule by which there is a single software version per software component. In other words, there is a single unique software version identifier, known as the PNR (Part NumbeR) per FIN.

It has been observed that DAFA software components are generally frequently updated and are often very large. It is therefore desirable to simplify the configuration rules linked to these software components.

The invention thus aims in particular to provide the DAFA software components directly to the software components that use them without having to use a central installation system. It is up to the software component receiving the data to manage the configuration thereof. As a result of the invention, an operator on the ground can perform a DAFA software component update and monitor the update without having to visit the aircraft.

According to the invention, it is preferably up to the software components using DAFA software components to report on the configuration thereof, in a central configuration report, in the form of identifiers corresponding to the installed versions (PNR) in order, in particular, to enable an operator to certify the DAFA software component update. Moreover, the software components using DAFA software components preferably report summary components resulting from the compilation of the DAFA software components in the central configuration report to facilitate the management of data in summary form by an operator.

Advantageously, it is possible to only send to the aircraft data that have changed, i.e. increments, to reduce transmission costs and improve the update speed.

To this end, the invention is based on a mechanism that in this case comprises the following functions:

an import and routing function capable of directing received ACLSPs to a central installation service or directly to one or more software applications using DAFA software components;

a function of monitoring the importing and processing of the DAFA software components by the software components that use them;

a central configurations collection function, configured to interrogate the software components using DAFA software components in order to include items of configuration information and/or summary data relating to the DAFA software components in the configuration report; and a function making it possible, if necessary, to perform on-board software data processing, for example activating data installed but not made available for use on board the aircraft.

Figure 2:
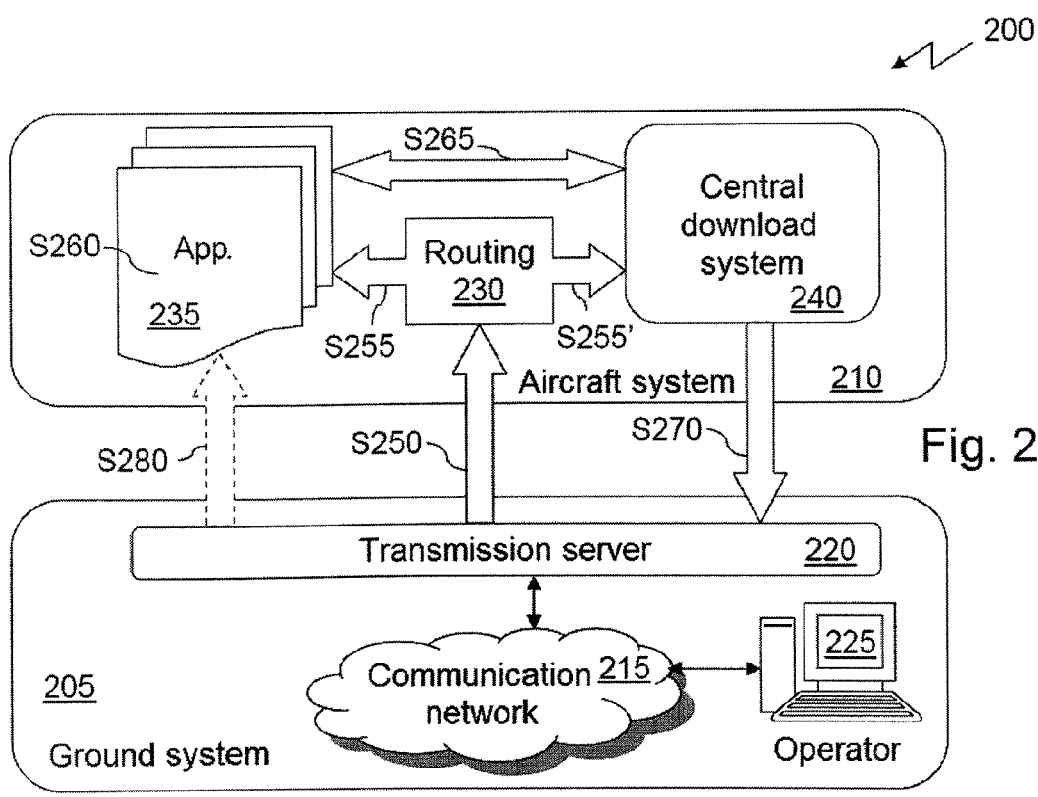
FIG. 2 shows an embodiment of the invention for updating DAFA software components on an aircraft.

FIG. 2 shows an embodiment of the invention for updating DAFA software components on an aircraft.

As shown, the update environment 200 comprises in this case a ground computer system 205 and an aircraft computer system 210.

The ground computer system 205 comprises a communication network 215 to which are connected a transmission server 220 and an operator terminal 225, for example a PC (Personal Computer).

The aircraft computer system comprises in this case a reception and routing module 230 configured to send received software components to one or more data consumer applications 235, i.e. in this case software applications using DAFA software components, and/or to a central download system 240.

To update a software component of a computer system 210 of a given aircraft, an operator uses in this case a terminal 225 to initiate a transfer of at least one software component to the computer system 210. This software component is typically transmitted in the form of FLS (Field Loadable Software) with the associated instructions and/or parameters in the form of a software component known as "a load", for example a load in accordance with the standard ARINC 665, during a step S250. Such parameters comprise in particular items of FLS classification information in accordance with the standard ARINC 667.

Thus, when the reception and routing module 230 receives a load, it analyses it to extract an item of classification information therefrom in order to transmit the received load to one or more software applications using DAFA software components (data consumer applications) or to the central download system. If it is a DAFA software component, it is sent to the corresponding application(s) of the OAB in a step S255. Alternatively or additionally, it is sent to the central download system in a step S255'.

The transmission of loads to applications can be multicast, i.e. from the reception and routing module to several applications, or unicast, i.e. from the reception and routing module to a single application. Unicast transmission is generally more efficient in that a single application is notified.

It is observed in this case that as DAFA software components (or DAFA data) are updated frequently and automatically, it is possible for errors to occur in the selection of DAFA loads (i.e. loads comprising DAFA software components) to be transmitted. In order to handle such potential errors, a load notification and transmission system placed between the reception and routing module and the software components using DAFA software components enables the software components using DAFA software components to validate the DAFA loads received, i.e. to accept or reject them. Such acceptance or rejection is preferably transmitted to the operator terminal from which the action originated. The acceptance or rejection decision is typically based on the comparison of items of information transmitted in the load with predetermined items of information, to check, for example, that the data received correspond to required data.

During a subsequent step, S260, the DAFA data received are processed by the computer system 210 in order to be taken into account by the target applications. The DAFA data processing consists in particular of checking that the DAFA can actually be taken into account by the target application. This makes it possible, in particular, to give rapid feedback to the operator who initiated the action.

Thus, for example, when a load comprising DAFA data contains an incremental data change (for one or more specific applications), the target application(s) is/are then able to check that the data are compatible with the data that it/they previously had.

If the DAFA data received are accepted, the target application(s) can use them directly or, alternatively, store them for future activation, in order to defer the impact of the update. Such an embodiment can in particular be necessary when a target application of the data received is being used by the operator.

When an application accepts DAFA data received, it is in this case capable of reporting on its new configuration. The mechanism utilized to this end can be specific to each application in order to give them a choice of data update mechanism utilization. Each application is thus responsible for its configuration. This decentralization of data configuration management makes it possible in particular to avoid subjection to rules that force the use of a sole technical solution per functional identifier.

An application can thus declare that its configuration is the result of the stacking of several changes for a single function, each change contributing to the final definition.

In order to avoid the generation of numerous configuration reports and pool the transmission means between the aircraft and ground computer systems, the configuration reports linked to the DAFA data received, generated by the target applications, are advantageously included in the central configuration report of the aircraft.

To this end, as shown by step S265, the central download system 240 makes a request corresponding to each software component using DAFA software components (that is, each DAFA client application). These applications respond by providing a set of configuration components extended via a list of attributes positioned by the DAFA client application.

These additional attributes are, for example, date, validity and extended name information items.

As described with reference to FIG. 3, the FIN corresponding to applications not receiving DAFA have a single PNR, whereas for DAFA load client applications, several PNRs can exist simultaneously, which makes possible incremental updates in particular.

The PNRs listed in the configuration report enable an operator to certify that an update operation has been performed correctly. The additional items of information enable the data managers to know with accuracy the effectiveness of the data on board the aircraft, beyond a mere PNR list. If the data installed is not automatically rendered effective, the status of said data advantageously forms part of the configuration report provided by the application.

For certification reasons, the aircraft operators must show that the data on board the aircraft under their control are consistent. As the DAFA data changes frequently, the mechanism described above makes it possible to prepare the aircraft in advance by installing a set of data that are then known as "latent". Said latent data are ready to be activated but are not actually used by the target applications. At the operator's request, via a request on board or from the ground, the latent data are switched to replace or supplement the data previously used by the target applications.

The request, shown as S280 in FIG. 2, can in particular be triggered automatically, for example on a set date or when an event occurs, or manually from the ground or on board.

On receipt of such a request, the target application makes the switch and updates its configuration report. Thus, the operator on the ground knows the exact configuration of the data installed and actually in use on board.

Figure 3:
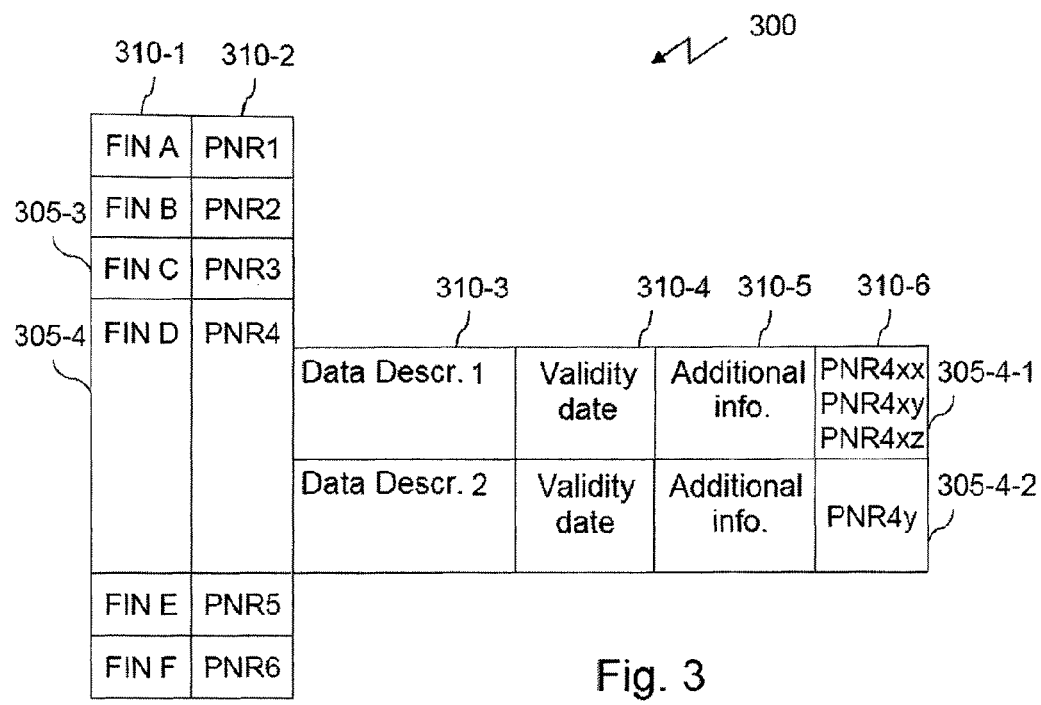
FIG. 3 shows an example of the structure of a configuration report in table format, created in a system utilizing the invention.

FIG. 3 shows an example of the structure of a configuration report 300 in table format, created in a system implementing the invention.

In this case, the configuration report is a set of rows generically shown as 305 and a set of columns generically shown as 310. It comprises two parts, one formed by columns 310-1 and 310-2 and the other by columns 310-3 to 310-6.

In this case, columns 310-1 to 310-6 relate respectively to functional locations, first unique software version identifiers, data descriptions, validity dates, additional items of information and second unique software version identifiers.

The first part corresponds to a standard configuration report. In this case it is filled in by the central configuration system. In this first part, each row corresponds to a functional location. Thus, for example, row 305-3 corresponds to functional location FIN C, in this case a software component of a LSAP application, and row 305-4 corresponds to functional location FIN D, in this case a software component of an OAB application. Each functional location is associated with a unique software version identifier. By way of illustration, the unique software version identifiers PNR3 and PNR4 are associated with functional locations FIN C and FIN D respectively.

The second part of the configuration report relates to items of information specific to DAFA data. As said items of information are associated with one or more applications, they are dependent on functional locations of OAB application software components. Said second part is filled in by software components using DAFA software components. By way of illustration, rows -1 and 310-4-2, which relate to two DAFA software components, are associated with the software component in functional location FIN D. In other words, the software component in functional location FIN D corresponds to an application that uses data described in rows 310-4-1 and 310-4-2.

It must be noted here that although a unique software version identifier is associated with each functional location of LSAP or OAB application software components, several software version unique identifiers can be associated with each DAFA software component, enabling incremental updating by subcomponent. Thus, for example, the software version unique identifiers PNR4xx, PNR4xy and PNR4xz are associated with a software component relating to data identified in row 305-4-1, which itself is associated with the functional location of an OAB application software component shown as FIN D.

Figure 4:
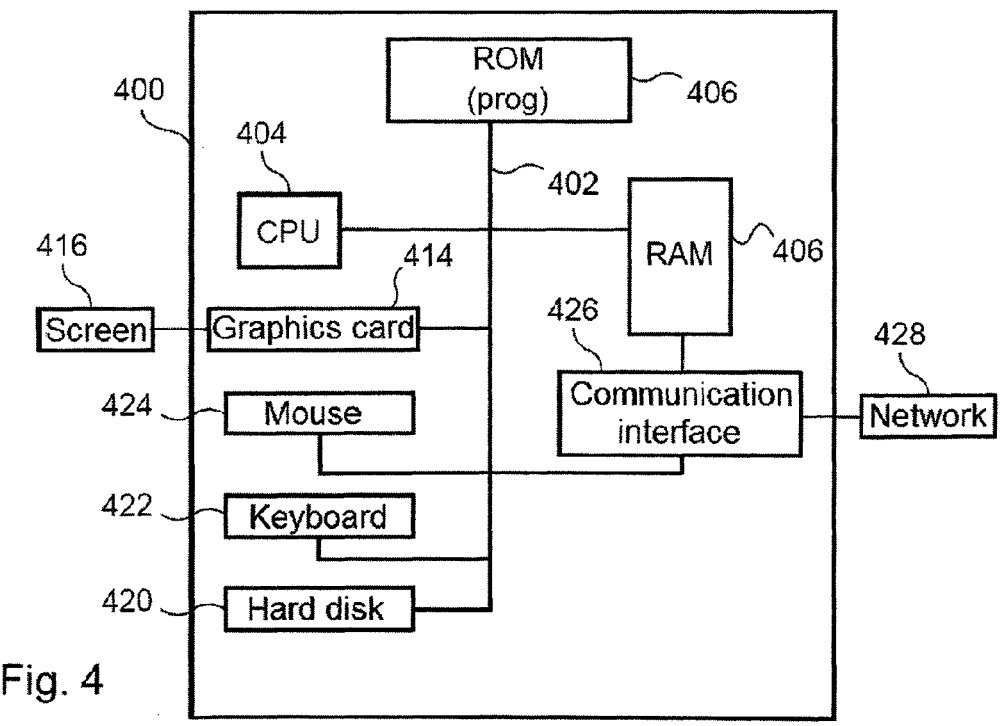
FIG. 4 shows an example of a device for processing items of information that is suitable for utilizing the invention or part of the invention.

FIG. 4 shows an example of a device for processing items of information which can be used to implement the invention, at least partially, and particularly the steps described with reference to FIG. 2. The device 400 is an example of a calculator such as an IMA (Integrated Modular Avionics) calculator or a computer.

The device 400 preferably comprises a communication bus 402 to which the following are connected:

a central processing unit (CPU) or microprocessor 404;

a Read Only Memory (ROM) 406, which can contain the operating system and programs such as "Prog"; and a Random Access Memory (RAM) or cache memory 408, containing registers capable of storing variables and parameters created and modified during the execution of the aforementioned programs; and a communication interface 426 connected to a distributed communication network 428, for example the AFDX (Avionics Full DupleX) network, said interface being capable of transmitting and receiving data, particularly software component update data.

Optionally, the device 400 can also have the following components:

a graphics card 414 connected to a screen 416;

a hard disk 420 that can contain the aforementioned programs "Prog" and data processed or for processing according to the invention;

a keyboard 422 and a mouse 424 or any other pointing device such as a light pen, touch screen or remote control enabling the user to interact with the programs according to the invention; and a memory card drive (not shown) capable of reading from or writing to the memory card data processed or for processing according to the invention.

The communication bus enables communication and interoperability between the various components included in the device 400 or connected thereto. The representation of the bus is not limitative and, in particular, the central unit is capable of communicating instructions to any component of the device 400 directly or by means of another component of the device 400.

The executable code of each program enabling the programmable device to implement the processes according to the invention can be stored, for example, on the hard disk 420 or in the ROM 406.

According to a variant, the executable code of the programs can be received by means of the communication network 428 via the interface 426, to be stored in the same way as described above.

More generally, the program(s) can be loaded onto one of the storage means of the device 400 before being executed.

The central unit 404 will control and direct the execution of the instructions or software code portions of the program(s) according to the invention, said instructions being stored on the hard disk 420 or in the ROM 406 or on the other aforementioned storage components. On start-up, the program(s) that is/are stored in a non-volatile memory, for example the hard disk 420 or the ROM 406, are transferred to the RAM 408, which then contains the executable code of the program(s) according to the invention, together with registers to store the variables and parameters necessary to implement the invention.

It must be noted that the communication device containing the device according to the invention can also be a programmed device. Said device then contains the code of the computer program(s), for example fixed in an application specific integrated circuit (ASIC).

Naturally, to meet specific needs, a person skilled in art could make changes to the above description.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. A method for updating at least one software component belonging to at least one operationally approved software application utilized in an aircraft computer system, said method being characterized in that said at least one operationally approved software application comprises at least one first software component using at least one second software component and in that it comprises the following steps:
receiving, by the aircraft computer system, a software component comprising at least one update of said at least one second software component;
analyzing, by the aircraft computer system, said at least one received software component and determining a class of said at least one update of said at least one second software component in response to said analysis step wherein the class is based on at least one of a plurality of regulations and a plurality standards;
transmitting, depending on said class, by the aircraft computer system, said at least one update of said at least one second software component to at least one of said at least one first software component and a central download system;
if said at least one update of said at least one second software component is transmitted to at least said at least one first software component, updating of said at least one second software component by the aircraft computer system;
creating a configuration report showing said update;
interrogating said at least one first software component to obtain items of configuration information from said at least one first software component relating to said at least one second software component;
integrating said obtained items of configuration information into a configuration report generated by said central download system;
receiving an activation request of said update of said at least one second software component, said step of updating said at least one second software component being performed in response to the receipt of said activation request, which said items of configuration information comprise an indication of activation or non-activation of said update of said at least one second software component.

2. The method according to claim 1, further comprising a step of validating said received software component.

3. The method according to claim 1, further comprising a step of validating said at least one update of said at least one second software component.

4. The method according to claim 1, further comprising a step of receiving an activation request of said update of said at least one second software component, said step of updating said at least one second software component being performed in response to the receipt of said activation request.

5. The method according to claim 4, according to which said items of configuration information comprise an indication of activation or non-activation of said update of said at least one second software component.

6. The method according to claim 1, further comprising a step of receiving an activation request of said update of said at least one second software component, said step of updating said at least one second software component being performed in response to the receipt of said activation request.

7. The method according to claim 6, further comprising a step of generating said activation request.

8. A computer program stored in a computer readable memory and executed on a computer, the computer program comprising instructions for the implementation of:
receiving, by the aircraft computer system, a software component comprising at least one update of said at least one second software component;
analyzing, by the aircraft computer system, said at least one received software component and determining a class of said at least one update of said at least one second software component in response to said analysis step wherein the class is based on at least one of a plurality of regulations and a plurality standards;
transmitting, depending on said class, by the aircraft computer system, said at least one update of said at least one second software component to at least one of said at least one first software component and a central download system;
if said at least one update of said at least one second software component is transmitted to at least said at least one first software component, updating of said at least one second software component by the aircraft computer system;

creating a configuration report showing said update;

interrogating said at least one first software component to obtain items of configuration information from said at least one first software component relating to said at least one second software component;

integrating said obtained items of configuration information into a configuration report generated by said central download system;

receiving an activation request of said update of said at least one second software component, said step of updating said at least one second software component being performed in response to the receipt of said activation request, which said items of configuration information comprise an indication of activation or non-activation of said update of said at least one second software component.

9. A device comprising a processor configured for the implementation of:

receiving, by the aircraft computer system, a software component comprising at least one update of said at least one second software component;

analyzing, by the aircraft computer system, said at least one received software component and determining a class of said at least one update of said at least one second software component in response to said analysis step wherein the class is based on at least one of a plurality of regulations and a plurality standards;

transmitting, depending on said class, by the aircraft computer system, said at least one update of said at least one second software component to at least one of said at least one first software component and a central download system;

if said at least one update of said at least one second software component is transmitted to at least said at least one first software component, updating of said at least one second software component by the aircraft computer system;

creating a configuration report showing said update;

interrogating said at least one first software component to obtain items of configuration information from said at least one first software component relating to said at least one second software component;

integrating said obtained items of configuration information into a configuration report generated by said central download system;

receiving an activation request of said update of said at least one second software component, said step of updating said at least one second software component being performed in response to the receipt of said activation request, which said items of configuration information comprise an indication of activation or non-activation of said update of said at least one second software component.

\* \* \* \* \*